July 27, 1965

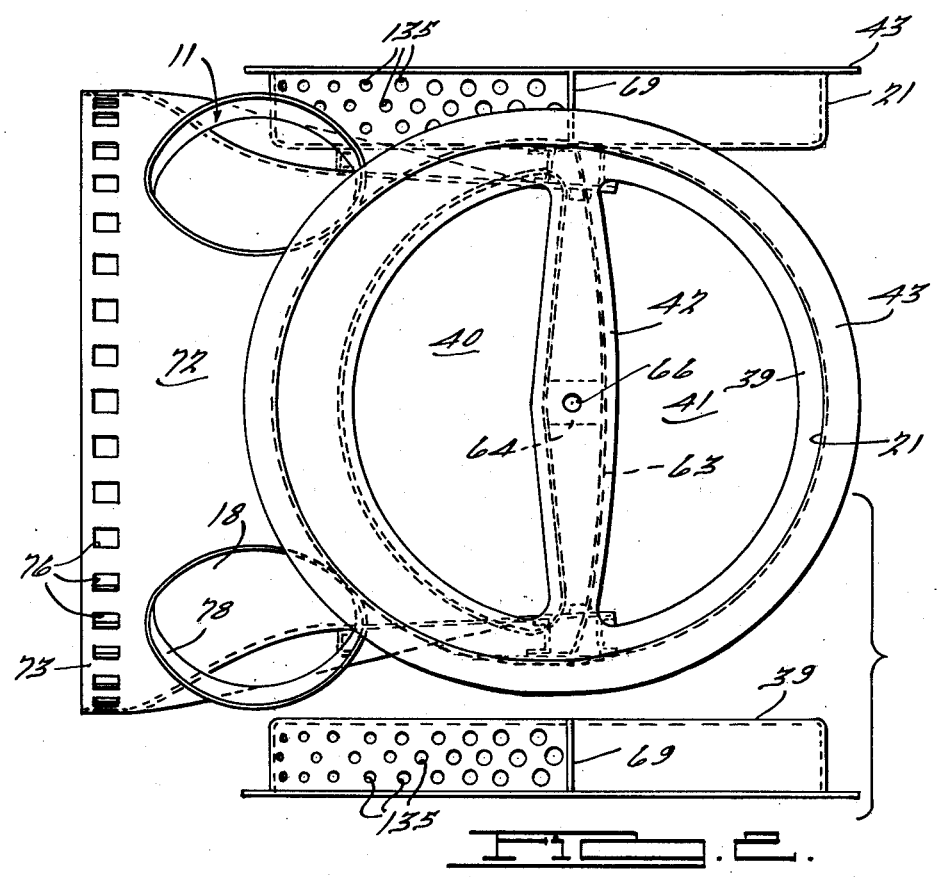

W. HENNY 3,196,611

GAS TURBINE ENGINE

Filed July 3, 1961

INVENTOR.
Willi Henny
BY
Harness & Harris
ATTORNEYS.

United States Patent Office 3,196,611
Patented July 27, 1965

3,196,611
GAS TURBINE ENGINE
Willi Henny, Southfield, Mich., assignor to Chrysler Corporation, Highland Park, Mich., a corporation of Delaware
Filed July 3, 1961, Ser. No. 121,395
14 Claims. (Cl. 60—39.51)

This invention relates to the assembly and arrangements of parts in a gas turbine engine particularly adapted for automotive use.

An object of the present invention is to provide improved means for supporting and housing the rotors, compressor, and burners for an automotive gas turbine engine which is particularly simple, rugged, compact, and economical in structure and efficient in operation.

Another object is to provide an improved gas turbine engine having inner and outer housings, the inner housing containing an annular passage for motive gases. The outer housing includes an outer shell enclosing the inner housing and adapted to be fabricated primarily from sheet steel. Four circular openings are provided in the shell at equally spaced locations around the axis of the annular passage, each containing an outwardly opening pan comprising a cylindrical regenerator receiving chamber. The outer edge of the sidewall of each pan is secured to said outer shell. Underlying the base of each regenerator chamber or pan, the inner housing provides a frame structure adapted to support the pan and an axial flow regenerator rotatably mounted in the latter, the axis of rotation of each regenerator extending centrally through the associated frame structure perpendicularly thereto and to the axis of the annular gas passage. The portion of each frame structure underlying each regenerator pan is provided with a sector-shaped gas passage bounded at one side by a cross member extending generally diametrically of the overlying pan. Underlying the frame structure and extending in the direction across the associated sector openings from the cross members is a sheet baffle terminating in an edge secured to the outer housing. Otherwise the baffle is spaced from the outer shell and is cooperative therewith to provide an inlet air passage around the axis of the annular motive gas passage. The baffle and pans are each provided with sector-shaped openings coextensive with the associated openings in the frame structure. Also the bottom of each pan is provided with a second semi-circular sector-shaped gas passage opening spaced from the first named sector-shaped opening therein by a diametrical cross arm of the pan bottom overlying the cross member of the associated frame structure. Coaxial with the annular gas passage and carried by the axially spaced end walls of the outer housing respectively are a pair of annular bearing supports which extend toward each other into the space bounded by the inner wall of the annular gas passage and provide journal means for the shafts of a compressor driving rotor and a power rotor rotatable coaxially within said space.

Other objects are to provide such an engine wherein the bearing support for the compressor driving rotor shaft enlarges axially in the direction toward its respective outer housing end wall and terminates in an annular rim slidably connected with the end wall to minimize thermal stresses at the region of the connection and to provide adequate leverage for supporting the bearing for the compressor driving rotor. The latter bearing support is also connected by radially inwardly projecting web means with a bearing support for the compressor driving shaft located adjacent the end wall.

Another object is to provide such an engine wherein the end wall which carries the bearing support for the compressor rotor comprises an inner compressor wall and cooperates with an outer wall of the outer housing to define a housing for an axial flow compressor mounted on an axial endwise extension of the shaft for the compressor driving rotor. The compressor discharges radially into an annular diffuser formed between the inner compressor wall and outer shell portion which are connected together and spaced apart by suitable diffuser blades. The diffuser discharges radially into said inlet air passage which communicates with each regenerator chamber by means of a plurality of flow distributing orifices in the sidewalls of the regenerator chamber or pans.

In the above regard, each regenerator is spaced from the sidewall of its associated pan to provide an annular coolant air chamber, whereby the pressurized air from the compressor bathes the regenerator and its periphery driving mechanism in a flow of comparatively cool air. Also secured to the outer shell over the regenerator in each pan is a cover which provides an inlet air chamber overlying the coextensive sector-shaped openings in the pan and frame structure. The annular coolant air chamber communicates directly with the inlet air chamber. By suitably dimensioning and arranging the aforesaid flow distributing orifices, a predetermined and comparatively uniform distribution of inlet air over the surface of the regenerator within each inlet air chamber can be achieved. Between the baffle and bearing support for the compressor driving rotor shaft is a chamber opening into the radially inner ends of four cylindrical burner chambers extending radially through the outer shell and baffle at locations spaced around the axis of the rotor shafts and being closed at their radially outer ends. Thus the burner chambers receive combustion supporting inlet air from the regenerators. A burner within each burner chamber admixes fuel with the inlet air and discharges the gaseous combustion products into the upstream end of the annular motive gas passage.

Another object is to provide an inner housing for a gas turbine engine wherein the frame structure comprises four channel steel frame assemblies underlying the four regenerator pans respectively and welded together at their juxtaposed edges to complete an inner housing of box section, each frame assembly also comprising inner and outer walls spaced radially by a web to complete a frame assembly of box section, the spacing between the inner and outer walls of each frame assembly increasing to a maximum at the region of the diametrical cross members to afford optimum support for the regenerators and optimum reinforcement for the inner housing at its region most remote from its attachment with the outer housing.

Another object is to provide an improved gas turbine engine of the above character wherein the regenerator supporting pans are formed as separate sheet metal stampings which are recessed into the outer housing shell, welded to the underlying frame structure entirely around the sector-shaped openings, and also welded to the outer shell entirely around the peripheries of the outer edges of the pans. The juxtaposed bottom edges of the pans at the region of a plane through the diameters of the pans and perpendicular to the axis of the rotors are also welded together. Thus the regenerator supporting pans reinforce both the inner and outer housings and enable the fabrication of a rugged housing structure largely from formed sheet metal parts.

Other objects of this invention will appear in the following description and appended claims, reference being had to the accompanying drawings forming a part of this specification wherein like reference characters designate corresponding parts in the several views.

FIGURE 2 is an elevational view of the inner housing with the regenerator removed.

FIGURE 3 is a fragmentary enlarged sectional view taken in the direction of the arrows substantially along the line 3—3 of FIGURE 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
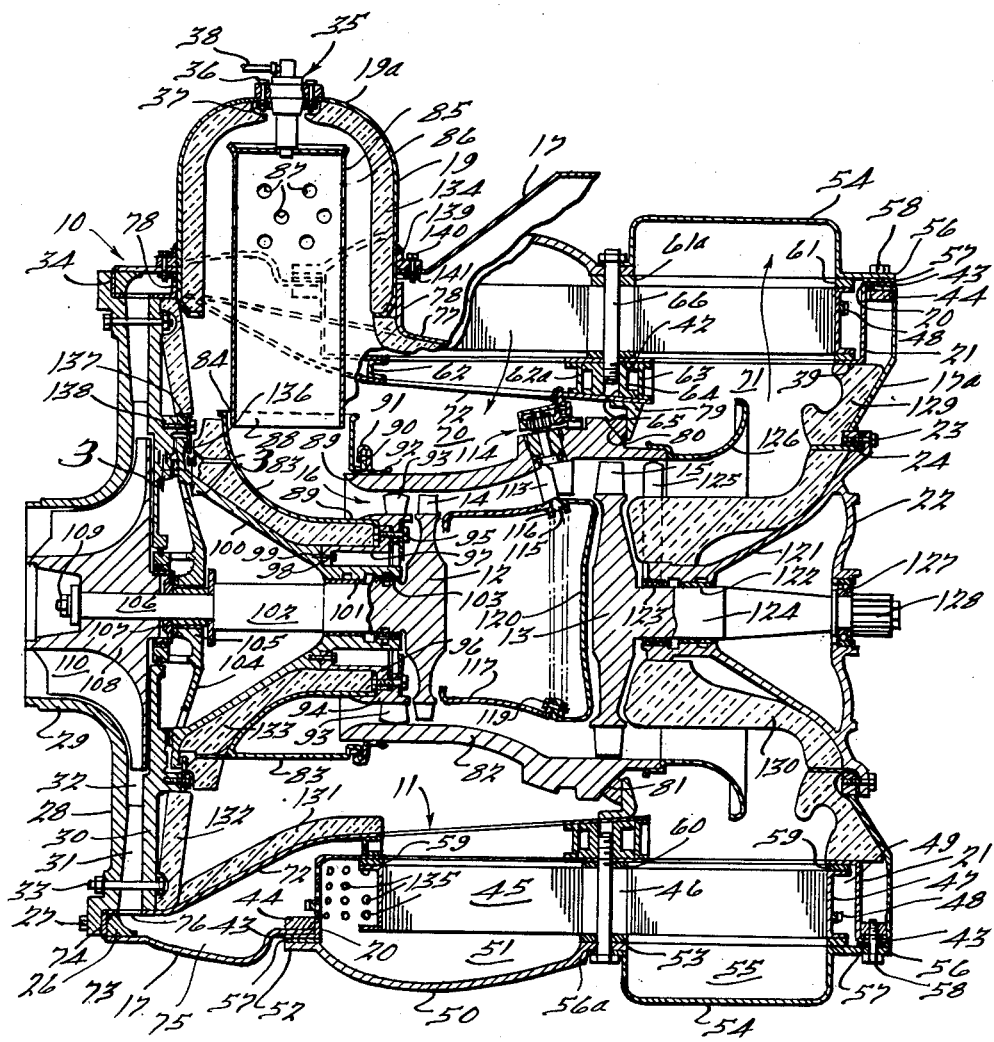
FIGURE 1 is a longitudinal mid sectional view through an automotive gas turbine engine embodying the present invention, taken in the direction of the arrows substantially along the line 1—1 of FIGURE 4, with a portion of the section being offset through the center line of the burner.

Referring to the drawings, a particular embodiment of the present invention is illustrated by way of example in an automotive type gas turbine engine having an outer housing 10 and an inner housing 11, FIGURES 1 and 2, cooperating to contain a compressor driving rotor 12 and a coaxial power rotor 13. The rotors 12 and 13 are provided with circumferentially spaced peripheral blades 14 and 15 respectively rotatable within a coaxial annular gas passage 16 which conducts motive gases to the rotor blades for driving the associated rotors.

The outer housing 10 includes an outer sheet metal shell 17 having four generally circular openings 18 therein spaced 90° apart around the axis of the rotors 12 and 13. The openings 18 are closed by four cylindrical and generally radially extending burner chambers 19. An annular bracket 139 welded to the base of each burner housing 19 adjacent the shell 17 is secured thereto by bolts 140 screwing into an annular tapping ring 141 welded to the underside of shell 17. Centered between each pair of chambers 19 and located in the outer shell 17 at locations spaced 90° apart around the rotor axis and downstream of the chambers 19 are four generally circular openings 20 for a corresponding number of regenerator receiving pans or chambers 21. The latter open radially outwardly and are slightly elongated in the direction of the rotor axis, FIGURE 2.

At the downstream end of the shell 17, the latter terminates in a radially inbent flange 17a connected with an end closure plate 22 by means of bolts 23 screwed into an annular tapping ring 24 welded to the inner circumference of the flange 17a. The upstream edge of shell 17 terminates at an annular tapping ring 26 to which it is welded and which is secured by bolts 27 to an outer end wall or plate 28 of the housing 10. Radially inwardly, the end plate 28 terminates in an axially extending cylindrical compressor chamber 29 which opens endwise to receive combustion supporting air.

An inner end wall 30 is spaced inwardly from end wall 28 by a plurality of radially extending diffuser blades 31 so as to provide an annular diffuser 32 adapted to receive compressed air from chamber 29 as described below. The walls 28 and 30 are connected together as a unitary structure by a plurality of bolts 33, a suitable sealing gasket 34 being employed between juxtaposed portions of tapping ring 26 and outer wall 28.

The radially outer ends of the chambers 19 are rounded at 19a and closed by a nozzle and igniter assembly generally indicated by the numeral 35 and secured to the dome 19a by a plurality of bolts 36 screwed into an annular tapping ring 37 welded to the inside of the dome 19a. The nozzle and igniter assembly 35 is suitably connected with a fuel supply and an electrical ignition circuit by the connection such as 38.

The bottom 39 of each regenerator receiving pan 21 comprises a supporting platform for a rotatable regenerator 45 and is provided with two generally semi-circular sector-shaped openings 40 and 41 spaced by a diametrical cross arm 42 of the bottom of the pan 21. The opening 40 is adapted for axially inward passage of comparatively high pressure inlet gases from the regenerator 45, whereas the opening 41 is adapted for radially outward passage of comparatively low pressure exhaust gases to the regenerator 45 as described below. The radially outer edge of the cylindrical side wall of each pan 21 terminates in a flange 43 overlying and welded to the adjacent portion of the shell 17 at a fluid tight seam entirely around the opening 20. Underlying the flange 43 at the inner side of shell 17 is an annular tapping ring 44 extending around the opening 20 to provide attachment means for a cover over the regenerator 21 as described below.

Each regenerator 45 has a cylindrical disc-type matrix comprising a multitude of small air passages arranged for flow of gases through the regenerator matrix in directions parallel to its axis of rotation, which in the present instance is parallel to a radius of the rotor axis extending perpendicularly to the bottom of the associated pan 21. The matrix is located around a central hub 46 and is confined within a peripheral channel-steel rim 47. A ring gear 48 extends coaxially around each rim 47 and is keyed thereto to drive the same by means of a driving pinion, not shown, in mesh with the gear 48 and operably connected with rotor 13. As indicated in FIGURES 1 and 2, the periphery of each regenerator 45 is spaced from the side wall of the associated pan 21 to provide a generally annular inlet air space 49 entirely around the regenerator. The space 49 is slightly larger around the upstream end of each regenerator 45 than at the downstream end, in order to provide adequate passage for combustion supporting air as described below.

Overlying each regenerator receiving pan 21 is an inlet dome 50 comprising part of the housing 10 and spaced from the associated regenerator 45 to provide an inlet air chamber 51 over the region of the regenerator 45 coextensive with opening 40. A generally sector-shaped flange of the dome or cover 50 includes a semi-circular portion 52 overlying flange 43 and a diametrical cross member 53 coextensive with the cross arm 42. Overlying each regenerator 45 at the region of the sector-shaped opening 41 is a low pressure dome 54 spaced from the regenerator to provide an exhaust chamber 55. Each dome 54 is likewise provided with a sector-shaped flange including a semi-circular portion 56 overlying the flange 43 and a diametrical portion 56a closely overlying the diametrical flange 53. The flanges 52 and 56 cooperate to complete a circular flange coextensive with the flange 43 and are spaced therefrom by a sealing gasket 57. A plurality of bolts 58 extending through the flanges 52, 56 and 43 and into the tapping ring 44 secure these elements together.

A circular seal 59 disposed between the bottom 39 of each pan 21 and the overlying flange of regenerator rim 47 is partitioned into two semi-circular sector-shaped openings coextensive with the openings 40 and 41 by a cross seal portion 60 disposed between the cross arm 42 and the inner surface of the matrix of the overlying regenerator 45. Also enclosing a sector-shaped opening coextensive with opening 41 is an outer seal having a semi-circular portion 61 disposed between flange 56 and the juxtaposed flange of regenerator rim 47 and having a diametrical portion 61a disposed between cross member 53 and the overlying portion of the matrix of the regenerator 45. The seals 59, 60 and 61, 61a are arranged to prevent inward leakage of the high pressure air surrounding the regenerator in chamber 49 and also to prevent intermixing of the high pressure air in chamber 51 with the lower pressure air in exhaust chamber 55. Thus inlet air entering chamber 51 is confined to a passage coextensive with the area 40 and directed inwardly through the regenerator matrix 45, whereas exhaust gases flowing radially outward through each regenerator 45 is confined to a passage coextensive with the area 41 and is directed into the exhaust chamber 55.

Radially inwardly of each regenerator supporting pan 21, the inner housing 11 comprises a box frame structure 62 formed from a separate channel-steel casting extending around the area of each sector-shaped opening 40. A diametrical portion 62a of the frame structure 62 underlies the left edge of each cross arm 42, FIGURE 1. As illustrated in FIGURE 1, the radial thickness of the structure 62 increases in the direction toward the cross portion 62a. Underlying the right edge of each cross arm 42 is a channel-steel cross member 63 similar to the member 62a. The radially outer surfaces or walls of the channel-steel portions 62, 62a and 63 extend parallel to the bottom of pan 21 and are welded to the immediately overlying bottom portions 39 and 42. The radially inner surfaces or walls of the channel members 62, 62a and 63 lie in a common plane which diverges from the plane of the bottom of pan 21 in the downstream direction. As illustrated in FIGURE 2, the cross members 62a and 63 bow outwardly from each other at the central region of the regenerator and are spaced by a cast steel hub support 64 suitably secured to the members 62a and 63. The support 64 is provided with a central threaded bore 65 into which is screwed the inner end of a bolt 66 which extends through flanges 56a and 53 and through the regenerator hub 46 to provide a journal for the latter.

Figure 4:
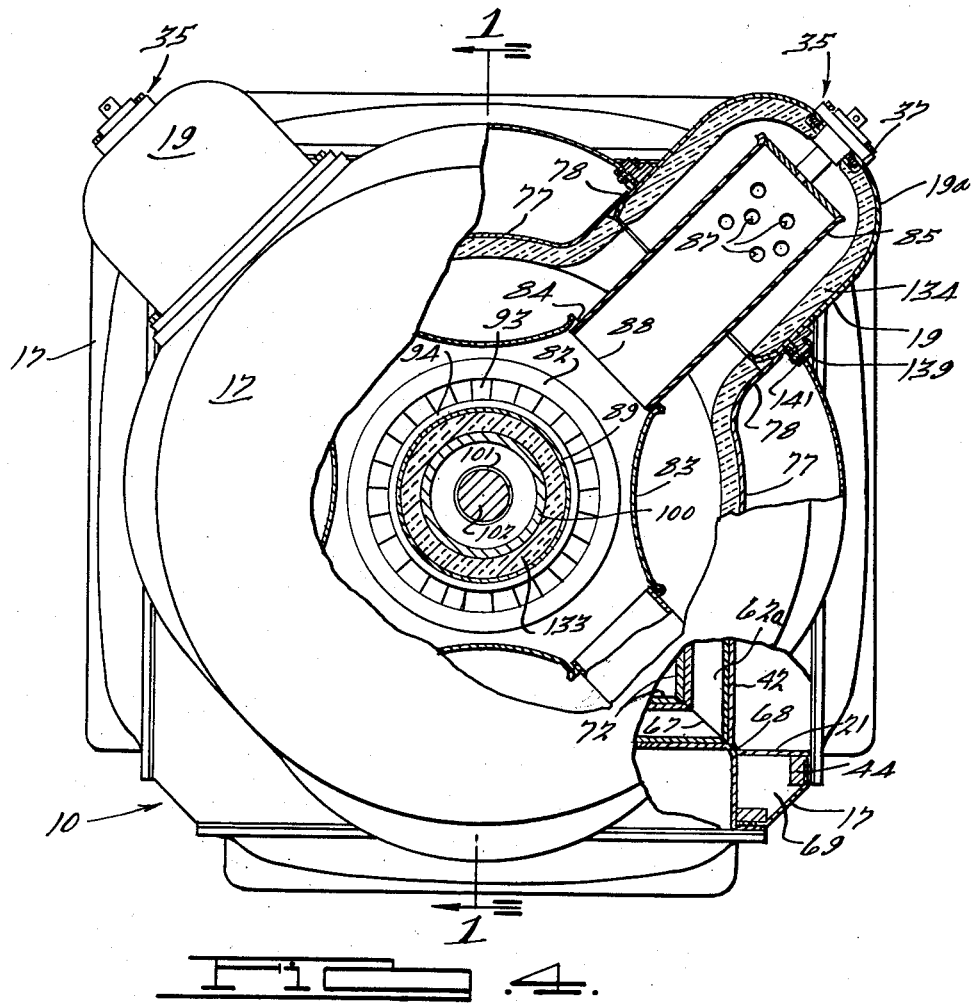
FIGURE 4 is a left end elevational view of FIGURE 1, a portion being broken away through the mid region of the burner, and a second portion being broken away at the region of a diametrical plane through the regenerators to show the connection between juxtaposed portions of the regenerator receiving pans and the frame structure of the inner housing.

As illustrated in FIGURE 4, the axially extending corner edges of the four channel-steel assemblies comprising the frame structure 62 underlying the four regenerator supporting pans 21 are mitered and welded together at 67. Also at the region of a diametrical plane through the regenerators 45 and perpendicular to the axis of the rotors 12 and 13, the bottoms of the pans 21 contact each other and are welded together at 68 and to the adjacent edges of the frame structure 62. A partition plate 69 lying in the aforesaid plane extends in the area bounded by the sides of juxtaposed pans 21 and the outer shell 17 and is welded to the pans 21, shell 17 and tapping rings 44 to cooperate with the frame structures 62, 63 and seals 60 and 61a and the inner structure of the engine described below to partition the engine into a high pressure upstream portion 70 and a low pressure downstream or exhaust portion 71.

A sheet steel baffle 72 underlies and is welded to the frame structure 62 and is provided with semi-circular sector-shaped openings coextensive with the openings 40. The baffle extends upstream from the frame structure 62 and terminates in an annular flange 73 overlying the periphery of the inner wall 30 and a shoulder 74 adjacent the outer periphery of wall 28 around which the tapping ring 26 extends. A plurality of circumferentially spaced gas passages 76 are provided in the flange 73 to afford communication between the outer peripheral opening of diffuser 32 and an inlet air passage 75 having baffle 72 and outer shell 17 for its inner and outer walls respectively. At the region of each of the chambers 19, the baffle 72 bulges outwardly at 77, FIGURE 1, and provides a cylindrical flange 78 closely confining the chamber 19.

Extending radially inwardly from the baffle 72 and welded thereto at the region of the cross members 63 is a bracket 79 having an annular surface extending perpendicularly to the rotor axis and slidably engaging a mating surface of a ring 80. The latter is also provided with a spherical surface slidably engaging an annularly formed spherical surface of an enlarged portion 81 of an outer annular shroud 82 for the gas passage 16. By virtue of the bracket 79 and ring 80, the high pressure and low pressure regions 70 and 71 respectively are partitioned from each other and an adjustable support is provided for the outer shroud 82 so as to accommodate for pressure and thermally induced dimensional changes between the latter shroud and engine frame structure. The operation and details of the adjustable mounting for the shroud 82 are described more fully in copending application Serial No. 59,101, filed September 28, 1960.

A sheet metal collecting chamber 83 is provided with four radially outwardly directed inlets 84 into which one of each of four cylindrical burners 85 discharge. Each burner 85 extends coaxially within one of each of the domes 19 and is supported therein by the burner assembly 35. Each burner 85 is also spaced from the side walls of its associated dome 19 to provide an annular passage 86 in communication with the high pressure air inlet region 70 and arranged for conducting the inlet air into the burner 85 through a plurality of inlet ports 87 in the latter. The radially inner end of each burner 85 discharges at 88 into one of each of the inlets 84, the four inlets 84 being in communication with an annular outlet 89 which discharges into the annular mouth of passage 16. The outer wall of collecting chamber 83 terminates in a radially outturned annular flange 90 extending around the upstream end of shroud 82 and is resiliently confined within a radially inwardly opening channel clip 91 having an annular rounded portion 92 resiliently engaging the outer surface of shroud 82 in sealing relation.

The upstream end of shroud 82 is supported by a plurality of fixed first stage nozzles 93 arranged circumferentially around the rotor axis within the passage 16 and extending integrally from an annular inner shroud section 94. The latter is provided with a plurality of radially inwardly extending legs secured by bolts 95 to an outturned flange 96 of a tubular support 97 coaxial with the rotor axis and having an annular inturned flange 98 secured by bolts 99 to a conical bearing support 100. The small end of the latter projects into the region bounded by annular passage 16 and provides a support for a bushing 101 having rotor shaft 102 journalled therein. The inner end of support 100 also carries a conventional labyrinth seal 103 around shaft 102, the latter in the present instance being integral with the compressor driving rotor 12 and extends axially outward therefrom. Details of the structure and operation of the tubular support 97 and its connection with the nozzles 93 are described more fully in copending application Serial No. 56,269, filed September 15, 1960, now Patent No. 3,077,756.

Integral with the axially outer portion of support 100 is an inwardly directed web 104 which carries a bushing 105 having the reduced extension 106 of shaft 102 journalled therein. A fluid sealing structure 107 is suitably carried in part by web 104 and inner wall 30. A hub 108 of an air compressor is rotatable coaxially within housing 29 outwardly of wall 30 and is keyed to shaft extension 106 by a bolt and washer assembly 109. Radially extending blades 110 integral with the compressor hub 108 are arranged to discharge compressed combustion supporting air into diffuser 32. The large end of support 100 is provided with three axially extending projections 111 adjacent its outer periphery and extending into radial guide slots 112 formed at the inner wall 30, FIGURE 3, to enable relative expansion and contraction between the wall 30 and support 100. A resilient supporting ring 136 spaced from wall 30 by an annular spacer 137 and secured thereto by bolts 138 closely overlies the outer rim of support 100 to yieldingly urge the latter axially endwise.

Arranged within the passage 16 immediately in advance of the rotor blades 15 are a plurality of adjustable flow directing nozzles 113 spaced uniformly around the rotor axis. The nozzles 113 are adjustably supported by a mechanism 114 carried by the outer shroud 82. Inasmuch as this structure is not directly concerned with the present invention, it is not described in further detail, reference being made to copending applications, Serial No. 34,172, filed June 6, 1960, now Patent No. 3,089,679, Serial No. 56,283, filed September 15, 1960, now Patent No. 3,074,690, and Serial No. 63,311, filed October 18, 1960, now Patent No. 3,013,771, for details of the structure 114 and the support for the intermediate inner shroud 117, including the ball extension 115 at the radially inner end of each nozzle 113 and the inwardly directed finger flanges 116 resiliently engaging axially opposite sides of the ball 115. Between the flanges 116 are similar finger flanges separated by spacers 118 and connected by bolts 119. The downstream end of shroud 117 is closed by a baffle 120 which prevents the motive gases flowing in passage 16 from bypassing the nozzles 113.

Associated with the power rotor 13 is a conical support 121 integral with end closure plate 22 and having its smaller end extending into the space bounded by passage 16 to provide a support for bushing 122 and labyrinth seal 123, the latter extend coaxially around shaft 124 integral with rotor 13 and extending axially therefrom through end plate 22. Shaft 124 terminates in a power takeoff gear 128 outwardly of end closure 22 and is suitably journalled in the latter by means of bearings 127. Extending radially from the small end of support 121 are three radial spokes 125 spaced uniformly around the rotor axis, and terminating in spherically rounded ends in sliding supporting engagement with the downstream end of outer shroud 82. Also secured to the downstream end of shroud 82 is an annular shroud extension 126 which discharges into the exhaust space 71 underlying regenerator 45 at the region of the sector-shaped opening 41.

A suitable ceramic insulation is provided for certain regions of the engine interior, including the annular insulation 129 secured to the inside of shell extension 17a, the annular insulation 130 around the exterior of conical support 121, the insulation 131 secured to the inside of baffle 72, the annular insulation 132 secured to the inside of wall 30, the insulation 133 spacing the inner wall of collecting chamber 83 and the bearing support 100, and the dome shaped insulation 134 secured to the inside of each burner chamber 19.

In accordance with the foregoing construction, the four regenerator receiving pans 21 are suitably formed as separate assemblies from sheet metal and are then recessed into openings 20 within the shell 17, the peripheral flange 43 of each pan 21 overlying and being welded to the adjacent portions of the shell 17. Also the bottom portions 42 and 39 of each pan 21 overlying each frame structure 62 are welded to the latter entirely around the sector-shaped opening 40, the downstream edge of cross arm 42 being welded to the cross member 63 of the structure 62. Also by reason of the box section of each frame structure 62 enlarging radially in the direction toward the cross members 62a and 63, optimum support is provided for the regenerators 45 at the region remote from the reinforced connection between the baffle 72 and end walls 28 and 30. Similarly, the baffle 72 is welded to the radially inner ends of the members 62a and 63 and to the remaining portion of frame structure 62 entirely around the sector-shaped opening 40. Also by reason of the axially extending edges of the frame structure 62 being welded together at 67, an inner housing of box section is achieved which provides optimum support for the upstream portions of the engine at the high pressure regions 70. It is to be noted that both of the conical bearing supports 100 and 121 are secured at the peripheries of their larger ends to their associated end walls 30 and 22 so as to provide optimum leverage for their unsupported inner ends within the space bounded by the annular gas passage 16.

In operation, upon rotation of rotor 12, compressor hub 108 and the blades 110 are rotated to drive pressurized air through diffuser 32 into inlet passage 75 and thence into each of the inlet chambers 51 via a plurality of flow distributing passages 135 in the upstream half of each regenerator pan 21. By suitably arranging and dimensioning the passages 135, a comparatively uniform flow of the inlet air can be obtained over the surface of each regenerator 45 within the chambers 51. The high pressure inlet air then flows in the direction of the arrows radially inwardly through the matrix of the regenerator 45 into the region 70, thence into the passages 86 and into burners 85 via ports 87. Within the burners 85, fuel is admixed to the incoming air and is ignited and discharged at 88 into collecting chamber 83. The hot combustion products then flow in the direction of the arrows through passage 16 into driving engagement with the rotor blades 14 and 15 and are exhausted into low pressure chamber 71. The exhaust gases then pass radially outward into exhaust passage 55 so as to heat the matrix of the regenerator prior to being exhausted to the atmosphere. By rotation of the regenerator, the heated portions of the matrix are rotated from the region of the sector-shaped opening 41 to the region of sector-shaped opening 40 whereby the inlet air flowing radially inwardly through the matrix of the regenerator is heated.

I claim:

1. In a gas turbine engine having a pair of coaxial rotors, an outer housing, an inner housing within said outer housing and containing said rotors, annular gas passage means supported by said inner housing coaxially with said rotors for conducting motive gases thereto, said outer housing including a plurality of domes at locations spaced around the axis of said gas passage means and rotors, said inner housing comprising a separate frame structure at the base of each dome and having a radially outer surface extending transversely to the radius from said axis at the central region of the associated dome, the edges of adjacent frame structures being secured together to complete an inner housing of box section transversely of said axis, each frame structure having a sector shaped gas passage therein and terminating in the downstream direction with respect to said gas passage means, in a cross member bounding an edge of said gas passage, a regenerator receiving pan within each dome and having a sidewall secured at its outer edge to said outer housing, the bottom of each pan comprising a platform parallel to the associated frame structure and having a pair of sector shaped gas passages therein spaced by a cross arm overlying the cross member of said frame structure, one of said pair of passages overlying the passage in the associated frame structure, a regenerator rotatably mounted within each pan, the bottom of each pan being secured at a fluid tight seal to the associated frame structure entirely around the overlying passages in said pan and frame structure.

2. In a gas turbine engine having a pair of coaxial rotors, an outer housing, an inner housing within said outer housing and containing said rotors, journal means carried by said outer housing and rotatably supporting said rotors, annular gas passage means supported by said inner housing coaxially with said rotors for conducting motive gases thereto, a plurality of openings in said outer housing at locations spaced around the axis of said gas passage means and rotors, a regenerator receiving pan having a cylindrical sidewall associated with each opening, each pan having its bottom located inwardly of the associated opening and having its sidewall extending outwardly toward said outer housing and secured thereto around the opening, said inner housing comprising a separate frame structure underlying each pan, the edges of adjacent frame structures being secured together to complete an inner housing of box section, each frame structure having a sector shaped gas passage therein and terminating adjacent the diameter of the overlying pan in a cross member bounding an edge of said sector shaped gas passage, the bottom of each pan having a pair of generally sector shaped gas passages therein spaced by a cross arm overlying the cross member of the associated frame structure, one of said pair of sector shaped gas passages overlying the gas passage in the associated frame structure, the bottom of each pan being secured at a fluid tight seal to the underlying frame structure entirely around the associated passage therein, said inner housing also including a sheet baffle extending from said frame structures in the axial direction from said cross members to said sector shaped passages in said frame members and terminating in an edge secured to said outer housing around an axial opening therein, the last named opening having the axis of said rotors extending therethrough.

3. In the combination according to claim 2, said outer housing including inner and outer end walls, said inner end wall closing said axial opening and being secured adjacent its periphery to said sheet baffle, said outer end wall being spaced axially from said inner end wall to comprise an annular diffuser space and terminating radially inwardly in an axially outwardly extending annular projection defining said opening and comprising the outer wall of a compressor chamber in communication with said diffuser space.

4. In a gas turbine engine, an outer shell, an inner housing within said shell and defining in part an annular passage for motive gases, a plurality of regenerator receiving pans having sidewalls recessed into said shell and spaced therefrom, said pans being arranged circumferentially around the axis of said annular passage and the outer edges of said sidewalls being secured to said outer shell, said inner housing having a plurality of regenerator supporting frame structures, each underlying the base of one of each of said pans and being secured thereto, juxtaposed pans having tangential portions of said sidewalls connected together, and the edges of juxtaposed frame portions being connected together to complete an inner housing of box section.

5. The combination according to claim 4, each frame structure comprising radially spaced inner and outer walls having coextensive sector-shaped passages therein, the outer wall being parallel to the bottom of the overlying pan, the inner wall diverging from said outer wall in the direction of the flow of said motive gases, and a web extending entirely around said passages and secured to said walls to complete a frame structure of box section having a maximum radial thickness at the edge thereof terminating in said direction.

6. In a gas turbine engine, an outer housing, an inner housing supported within said outer housing and defining in part an annular passage for motive gases, said outer housing including an end wall, annular bearing supporting means coaxial with said annular passage and extending axially from said end wall into the space bounded by said annular passage, a rotor shaft journalled in said supporting means and extending at one end into said space along said axis, said supporting means enlarging radially in the axial direction toward said end wall and terminating in radially sliding engagement with said wall at locations remote from said axis, said wall and supporting means having a plurality of interfitting radially extending lugs and notches at said locations to effect said sliding engagement, and resilient means yieldingly urging said supporting means axially into said engagement.

7. In a gas turbine engine, an outer shell, an inner housing within said shell and defining in part an annular passage for motive gases, a plurality of regenerator chambers in said shell and spaced circumferentially around the axis of said annular passage, said inner housing having a plurality of regenerator supporting frame structures underlying and secured to the base of one of each of said chambers, an end wall carried by said shell at a location axially upstream of said inner housing, a baffle secured to upstream portions of said housing and extending axially therefrom around said axis to said end wall and secured thereto, said baffle being spaced radially inwardly from said shell and cooperating therewith to provide an inlet air duct discharging into said chambers.

8. In the combination according to claim 7, said end wall being supported by a portion of said shell spaced axially outwardly from said end wall and cooperating with said end wall to provide an annular air diffuser opening radially into said inlet air duct, said shell portion terminating radially inwardly in an annular housing for a compressor chamber coaxial with said annular passage and having an air receiving inlet opening axially endwise, said compressor chamber having an air outlet opening annularly into said annular diffuser.

9. In a gas turbine engine, an outer housing including an outer shell, an inner housing within said shell and defining in part an annular passage for motive gases, a plurality of regenerator receiving pans having sidewalls recessed into said shell, said pans being arranged circumferentially around the axis of said annular passage and the outer edges of said sidewalls being secured to said outer shell, said inner housing underlying the base of each of said pans and being secured thereto, said inner housing also including a sheet baffle extending axially from said pans to said outer housing and secured to the latter, said baffle being spaced from said outer shell to provide an inlet air passage in communication with a portion of the sidewall of each regenerator receiving pan, and the last named portion of each regenerator receiving pan having a plurality of spaced air distributing openings connecting said inlet air passage with the interior of each pan.

10. In a gas turbine engine, an outer shell, an inner housing within said shell and defining in part an annular passage for motive gases, a plurality of regenerator receiving chambers in said shell and spaced circumferentially around the axis of said passage, said inner housing including a separate frame structure radially inwardly of each chamber, each frame structure terminating in the downstream direction with respect to said gas passage in a downstream edge, the edges of circumferentially adjacent frame structures being secured together to complete an inner housing of box section transversely of said axis, each frame structure comprising radially spaced inner and outer walls having a radial opening therein for passage of gases radially therethrough from said chamber, said outer wall being normal to a radius from said axis at the central region of said chamber, said inner wall declining radially inwardly in said downstream direction at an angle to the plane of said outer wall, and a web extending entirely around said opening and secured to said walls to complete a frame structure of box section having a maximum radial thickness at the region of said downstream edge.

11. In the combination according to claim 7, a combustion chamber disposed between said end wall and said upstream housing portions, and said baffle merging with the walls of said combustion chamber to seal the same from said inlet air duct.

12. In a gas turbine engine, an outer shell, an inner housing within said shell and defining in part an annular passage for motive gases, a plurality of regenerator receiving pans having sidewalls recessed into said shell, said pans being arranged circumferentially around the axis of said annular passage and the outer edges of said sidewalls being secured to said outer shell, the portions of said sidewalls inwardly of said outer edges being spaced from said outer shell, dimetrically opposed portions of each pan abutting and being secured to the corresponding portions of the circumferentially adjacent pans, said inner housing underlying the base of each of said pans, the base of each pan and the underlying portion of said inner housing having aligned openings therein for radial flow of gases therethrough from said pan, said inner housing being secured at a fluid tight seal to each pan entirely around the periphery of said opening therein.

13. In a gas turbine engine, an outer housing, an inner housing supported within said outer housing and defining in part an annular passage for motive gases, a plurality of regenerator chambers in the outer portions of said outer housing and spaced circumferentially around the axis of said annular passage, an annularly arranged baffle coaxial with said passage and spaced radially inwardly from said outer housing to comprise therewith an annularly arranged inlet air duct means discharging into said chambers, said baffle extending axially from said chambers to an upstream end of said outer housing comprising inner and outer end walls, diffuser blades spacing said inner and outer walls, the space between said walls around the periphery of said inner wall comprising a diffuser opening radially into said annular inlet air duct means.

14. In a gas turbine engine, an outer housing, an inner housing supported within said outer housing and defining in part an annular passage for motive gases, said outer housing including an end wall, annular bearing supporting means coaxial with said annular passage and extending axially from said end wall into the space bounded by said annular passage, a rotor shaft journalled in said supporting means and extending at one end into said space along said axis, said supporting means enlarging radially in the axial direction toward said end wall and terminating in radially sliding engagement with said wall at circumferentially spaced locations remote from said axis, said wall and supporting means having a plurality of interfitting means at said locations to effect said sliding engagement and to restrain said supporting means against rotational movement with respect to said wall, and resilient means yieldingly urging said supporting means axially into said engagement.

References Cited by the Examiner

UNITED STATES PATENTS

| | | | |
|---|---|---|---|
| 2,795,928 | 6/57 | Huebner et al. | 60—39.51 |
| 2,803,438 | 8/57 | Hryniszak | 60—39.51 |
| 3,077,074 | 2/63 | Collman et al. | 60—39.51 |

FOREIGN PATENTS

| | | |
|---|---|---|
| 615,680 | 1/49 | Great Britain. |

SAMUEL LEVINE, *Primary Examiner*.

ABRAM BLUM, JULIUS E. WEST, *Examiners*.